United States Patent [19]
Wayland, Jr. et al.

[11] 4,092,800
[45] June 6, 1978

[54] VEGETATION CONTROL

[75] Inventors: James Robert Wayland, Jr.; Frank S. Davis; Morris Guy Merkle, all of College Station, Tex.

[73] Assignee: Phytox Corporation, College Station, Tex.

[21] Appl. No.: 737,909

[22] Filed: Nov. 2, 1976

Related U.S. Application Data

[63] Continuation of Ser. No. 400,139, Sep. 24, 1973, abandoned, which is a continuation of Ser. No. 225,109, Feb. 10, 1972, abandoned.

[51] Int. Cl.² ................................................ A01G 1/00
[52] U.S. Cl. .......................................... 47/1.3; 47/58; 47/DIG. 10; 47/1.43
[58] Field of Search ............... 47/1.3, 58, DIG. 10, 47/1.43

[56] References Cited

U.S. PATENT DOCUMENTS

| | | | |
|---|---|---|---|
| 2,064,522 | 12/1936 | Davis | 47/1.3 X |
| 2,750,712 | 6/1956 | Rainey | 47/1.3 |
| 3,443,051 | 5/1969 | Puschner | 47/1.3 |
| 3,559,337 | 2/1971 | Marcoux et al. | 47/1.3 X |

OTHER PUBLICATIONS

Soil Treatment———, Baker et al., Phytopathology, vol. 59, No. 2, pp. 193-197, 1969.

Primary Examiner—Robert E. Bagwill
Attorney, Agent, or Firm—Richards, Harris & Medlock

[57] ABSTRACT

Microwave transmitters generate electromagnetic energy at a desired frequency in the range of from 300 MHz to 300 GHz. Energy derived from the microwave transmitters is coupled into a waveguide for transmission to an energy radiator coupled to the waveguide. The energy radiator, waveguide and microwave transmitters are vehicle mounted such that the radiator is made to pass over areas in which it is desired to control vegetation. Vegetation, including seeds, in the path of energy emitting from the radiator absorbs the energy from the field resulting in internal changes in the plant or seed causing death or debilitation of the vegetation or seed.

7 Claims, 4 Drawing Figures

U.S. Patent
June 6, 1978
4,092,800
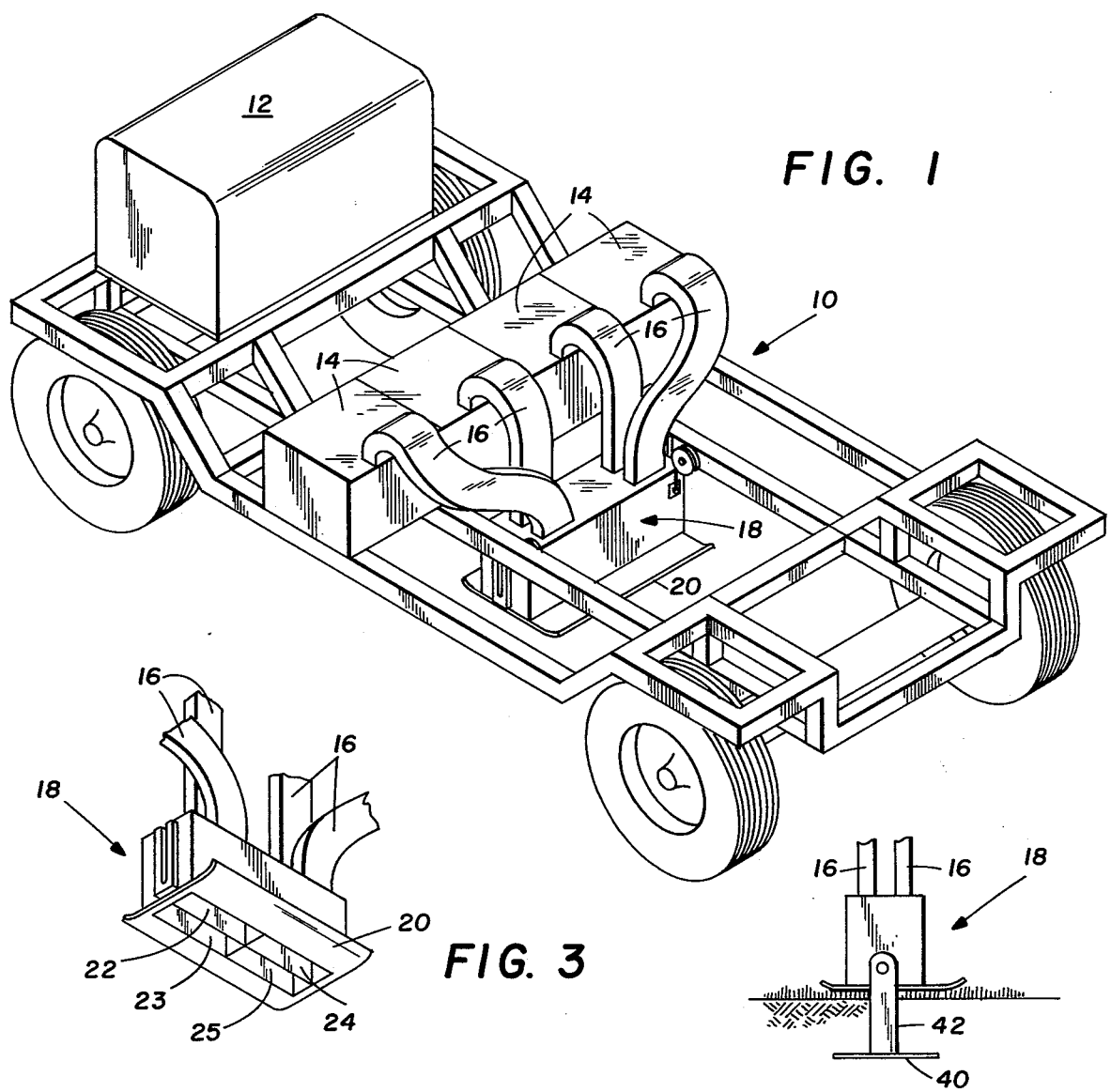
FIG. 1
FIG. 3
FIG. 4
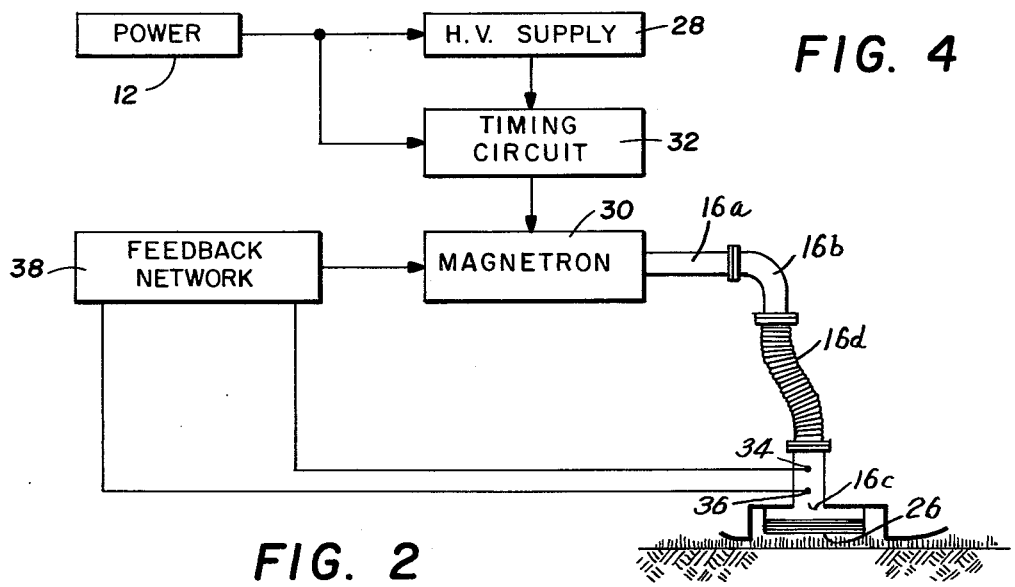
FIG. 2

VEGETATION CONTROL

This is a continuation of application Ser. No. 400,139 filed Sept. 24, 1973, which was a continuation of application Ser. No. 225,109 filed Feb. 10, 1972 (both abandoned).

This invention relates to a method of vegetation control, and more particularly to vegetation control by the application of an electromagnetic field in the microwave region to the controlled area.

Presently, the most effective methods available for controlling vegetation are chemical, i. e., the use of herbicides. Such chemicals leave harmful chemical residues which persist for various lengths of time and are thus ecologically detrimental. Other common methods of vegetation control are the use of fire and mechanical devices. Fire methods of vegetation control, in addition to adding to environmental pollution, are difficult to selectively control. Mechanical devices, while not environmentally detrimental, are often ineffective and usually quite expensive.

In addition to these known methods of vegetation control, there is available in the literature dissertations on vegetation control using low frequency fields at low intensities. See for example the publications of W. M. Iritani and T. W. Woodbury, *Idaho Agricultural Experimental Station Research Bulletin* 25 (1954) and D. W. Lambert, W. W. Worzella, R. C. Kindi, J. N. Cheadle, *Agron. J.* 42,230 (1950). Both of these works end with the conclusion that control of vegetation by low frequency fields does not have commercial potential.

In accordnce with the present invention, vegetation is controlled by the application of microwave fields to a selected area. After the vegetation in a given area has been cleared, there are no harmful residues and no environmental pollution. Areas which have been cleared may be immediately replanted without harmful effects on the new plants.

Apparatus for carrying out the method of the present invention has established reliability and provides inexpensive vegetation control. The method of vegetation control in accordance with the present invention includes the steps of generating an electromagnetic wave having a frequency in the range of from 300 MHz to 300 GHz for emission from an energy radiator. The area in which vegetation is to be controlled is subjected to the electromagnetic wave emission from the energy radiator. This energy is absorbed by the plant or plant seed causing death or debilitation.

A more complete understanding of the invention and its advantages will be apparent from the specification and claims and from the accompanying drawings illustrative of the invention.

Referring to the drawings:

FIG. 1 is a pictorial view of a skeletonized vehicle for transporting apparatus for carrying out the present invention over a vegetation controlled area;

FIG. 2 is a block diagram of the equipment for carrying out vegetation control in accordance with the method of the present invention;

FIG. 3 is a pictorial view of a typical energy radiator for application of an electromagnetic field to a controlled area; and FIG. 4 is a modification of the apparatus for carrying out the present invention where an underground energy reflector increases the energy density of the area to be cleared.

Referring to the FIGS. there is shown typical apparatus for carrying out the method of the present invention wherein a vehicle 10 is provided for transporting the equipment used to generate an electromagnetic field for application to an area selected for vegetation control. A gasoline engine driven generator 12, the generator may be driven by the power unit if the vehicle is self-propelled, provides a low frequency driving voltage to a series of four electromagnetic wave generators 14. The electromagnetic wave generators which generate a frequency in the range of from 300 MHz to 300 GHz may be magnetrons, klystrons or other sources of providing microwave energy. Typically, each of the generators may be of the type manufactured by Holaday Industries and identified as Model HI-1200. This is a microwave transmitter generating a frequency at 2450 ± 20 MHz and includes controls for varying the energy density therefrom. In addition, instead of continuous wave generators, pulsed waves may be employed by the vegetation control suggested. For certain selected applications, modulated signals are applied to the vegetation to be controlled.

Electromagnetic waves generated by the transmitters 14 are individually coupled to waveguides 16 of any available design such as the RG-284 waveguide. The waveguides 16 are coupled directly to an energy radiator 18 which, in the configuration shown, is a rectangular box with a base shoe 20 and including cavities 22-25, as shown in FIG. 3. To improve the coupling of energy from the waveguides 16 into the radiator 18, a dielectric material absorber 26, FIG. 2, is mounted within the cavity of the radiator 18. In accordance with standard microwave engineering techniques, a tuning slug (not shown) is included in each of the waveguides 16 for field matching so that the maximum intensity of energy is transmitted from the radiator 18 and the minimum reflector back to the transmitters 14.

Referring specifically to FIG. 2, there is shown a block diagram of the energy generating apparatus for selective area vegetation control. The power generator 12 provides a source of low frequency voltage to a high voltage supply 28 which steps up the voltage level for use in driving a magnetron microwave generator 30. Prior to coupling the high voltage output of the supply 28 to the magnetron 30, a warm-up period for the supply is required. This warm-up period is controlled by a timing circuit 32 responsive to the output of the generator 12 and coupled in the line between the supply 28 and the magnetron 30.

Electromagnetic energy from the magnetron 30 is transmitted through a waveguide 16 which comprises rigid sections 16a, 16b and 16c and a flexible section 16d. The flexible section provides the flexibility to position the radiator 18 with respect to the soil surface.

Mounted within the waveguide section 16c are sensors 34 and 36 for measuring the forward and reflected energy, respectively, to the radiator 18. Signals from the sensors 34 and 36 are applied to a feedback network 38 for controlling the power level output of the magnetron 30 for most efficient coupling of energy into the radiator.

As mentioned, in one model of a magnetron 30, the output frequency is 2450 ± 20 MHz. While this particular frequency has been shown to be effective, other frequencies within the range of from 300 MHz to 300 GHz are considered to be effective in vegetation control. For example, frequencies of 915 MHz, 5185 MHz and 21,000+ MHz are considered to be effective at vegetation control. Because of control by a governmental agency over the use of frequencies within the range suggested, approval of use of a particular frequency is required.

In the range of frequencies discussed, the absorption by vegetation is thought to occur principally by changes in the rotational energies of molecules in the object being exposed. The absorption of electromagnetic energy by rotations is the result of an interaction of the molecular dipole moment with the electromagnetic field. The molecule must have a permanent dipole moment to exhibit absorption in this frequency range.

Electromagnetic energy from the radiator 18 is applied to the seed or vegetation to be controlled by passing the absorber 26 directly in contact with the vegetation or the soil to be treated. Typically, the absorber may be a Pyro-Ceran having a dielectric constant halfway between air and soil. The energy level at which the magnetron 30 must be set is determined by the vegetation to be controlled. As a general rule, energy levels of from 150 to 300 joules/cm$^2$ is considered lethal to most plant vegetation and seeds.

Summarizing, vegetation control is provided by a method that includes the steps of generating an electromagnetic wave (continuous, pulsed or modulated) having a frequency in the range of 300 MHz to 300 GHz for emission from the energy radiator 18. The energy radiator 18 is passed over a selected area for subjecting the area of vegetation control to the electromagnetic emission from the radiator. Various degrees of effectiveness can be achieved by controlling the energy density of the wave emission from the radiator 18 and also the time exposure of the area of vegetation control.

Results of several treatments for vegetation control by the present invention will now be given. Each of these treatments used apparatus that generates electromagnetic energy at 2450 ± 20 MHz emitting from a radiator having an effective area of 16 square inches. Magnetrons each generating energy at the same frequency were coupled to the radiator.

EXAMPLE I

This treatment was for the purpose of desiccation/defoliation in the Freeport, Florida area with the environmental conditions as described below. The site received a light rain approximately 16 hours prior to treatment. Air temperature was 26° C; soil temperature 23° C; relative humidity 69%; with little or no wind and an overcast sky. The soil type at the site is Lakeland sand and the soil moisture, i.e., the precent (weight) water being held or found in the soil at a given time, at the time of treatment was approximately 10%. The soil is nearly void of silt, clay and organic matter with the sand content approaching 99%. Parameters and results are given below:

| Intensity (Watts) | Duration (Seconds) | Percent of Plants Desiccated |
|---|---|---|
| 1300 | 4 | 87 |
| 1300 | 8 | 94 |
| 1000 | 4 | 85 |
| 1000 | 8 | 95 |

EXAMPLE II

In a second treatment the control was for postemergence, that is, treatment involving vegetation and/or soil after emergence of the crop seedlings. For this treatment, environmental data were recorded as follows: air temperature 27° C; soil temperature 26° C; relative humidity 48%; winds gusting to 40 miles per hour with clear skies and a bright sun. The soil type on this site is Hidalgo sandy loam and the soil moisture, at the time of treatment, was approximately 12%. The composition of the soil type is 75% sand; 16% clay, 9% silt, 0.8% organic matter; and a pH of 8.1. Parameters and results of this treatment are given below:

| Intensity (Watts) | Duration (Seconds) | Broad leaves | | Grasses | |
|---|---|---|---|---|---|
| | | Counts | Percent Control | Counts | Percent Control |
| 500 | 8 | 9.7 | 69.4 | 12.3 | 49.4 |
| 500 | 16 | 9.6 | 69.7 | 14.3 | 41.2 |
| 500 | 32 | 3.0 | 90.4 | 1.7 | 93.1 |
| 1000 | 8 | 5.7 | 82.0 | 10.1 | 58.5 |
| 1000 | 16 | 4.0 | 87.4 | 14.3 | 41.2 |
| 1000 | 32 | 1.3 | 95.9 | 7.3 | 70.0 |
| 1300 | 8 | 8.4 | 73.5 | 11.0 | 54.8 |
| 1300 | 16 | 1.0 | 96.9 | 4.4 | 81.9 |
| 1300 | 32 | 1.3 | 95.9 | 2.7 | 88.9 |

EXAMPLE III

In a third treatment, preemergence, that is, treatment of the soil prior to the time of planting and prior to the emergence of weed seedlings, was performed at Weslaco, Texas. The environmental data recorded during the treatment was as follows: air temperature 27° C; soil temperature 26° C; relative humidity 48%; winds light, up to 5 miles per hour, with clear skies and sunshine. The soil type on this site is the same as in the previous example. Parameters and results are as follows:

| Intensity (Watts)/16 sqin | Duration (Seconds) | Broad leaves | | Grasses | |
|---|---|---|---|---|---|
| | | Plant Counts | % Control | Counts | % Control |
| 500 | 8 | 93.7 | 0 | 20.3 | 31.5 |
| 500 | 16 | 86.3 | 0 | 21.1 | 28.0 |
| 500 | 32 | 28.4 | 62.3 | 5.7 | 80.6 |
| 1000 | 8 | 59.3 | 21.3 | 14.4 | 50.9 |
| 1000 | 16 | 21.6 | 71.4 | 6.7 | 77.2 |
| 1000 | 32 | 15.0 | 80.1 | 2.7 | 90.8 |
| 1300 | 8 | 74.0 | 1.8 | 18.3 | 37.6 |
| 1300 | 16 | 38.9 | 49.4 | 7.3 | 75.1 |
| 1300 | 32 | 37.7 | 50.0 | 17.0 | 42.0 |

Results given in the above examples show that effective preemergence and postemergence vegetation control is possible. The invention is applicable to both postemergence and preemergence weed control in field crops, vegetable crops and forest and ornamental plant nurseries. Desiccation and defoliation of crops along with brush control and forest weed tree control are additional applications. Other uses of the present method will suggest themselves to those active in vegetation control.

One additional important area is aquatic weed control. Apparatus illustrated in FIG. 1, sans the vehicle 10, are float mounted such that the radiator 18 places the absorber 26 in contact with the vegetation to be controlled. Plants floating and in contact with absorber 26 will absorb the emitted radiation resulting in internal changes causing death or debilitation of the plant including parts below the water surface. Energy levels for lethal results are on the order of those given in the examples above as are the times of exposure.

Referring to FIG. 4, there is shown a modification of the radiator 18 to include a root plow 40 attached to the radiator by a bracket 42. In this embodiment, the radiator 18 moves along and in contact with soil to be treated. Below the soil surface the root plow 40 moves along with the radiator. Energy from the radiator enters the soil for vegetation or seed control. This energy is reflected from the plow 40 back into the area being cleared. By reflecting the energy in this manner, increased energy density is achieved for more effective control for a comparable energy density without reflection.

While the invention has been described with reference to specific frequency levels, energy levels and exposure times, and only one embodiment of apparatus for carrying out the invention has been described in detail herein and shown in the accompanying drawings, it will be evident that various modifications are possible without departing from the scope of the invention.

What is claimed is:

1. A method of vegetation control, comprising the steps of:
    generating an electromagnetic wave having a frequency in the range of from 300 MHz to 300 GHz for emission from an energy radiator;
    subjecting an area within which vegetation is to be controlled to the electromagnetic wave emission from the energy radiator; and
    reflecting the wave emission after it has passed through the area back into the area of vegetation control to achieve an energy density from approximately 150 Joules/cm$^2$ to approximately 300 Joules/cm$^2$ sufficient to cause the death or debilitation of the vegetation without raising the temperature of the area sufficiently to cause death or debilitation solely by thermal effects.

2. A method of vegetation control, comprising the steps of:
    generating an electromagnetic wave having a frequency in the range of from 300 MHz to 300 GHz for emission from an energy radiator;
    controlling the energy density of the electromagnetic wave emission from the radiator, said energy density being from approximately 150 Joules/cm$^2$ to approximately 300 Joules/cm$^2$;
    subjecting an area within which vegetation is to be controlled to the electromagnetic wave emission from the energy radiator; and
    controlling the exposure time of the area of control to the emission from the energy radiator to achieve an energy density sufficient to cause the death or debilitation of the vegetation without raising the temperature of the area sufficiently to cause death or debilitation solely by thermal effects.

3. A method of vegetation control, comprising the steps of:
    generating an electromagnetic wave in the range of from 300 MHz to 300 GHz;
    channeling the electromagnetic wave to an energy radiator for emission therefrom;
    controlling the energy density of the electromagnetic wave emission from the radiator, said energy density being from approximately 150 Joules/cm$^2$ to approximately 300 Joules/cm$^2$;
    directing the electromagnetic wave emission from the energy radiator to an area within which vegetation is to be controlled; and
    controlling the exposure time of the area of control to the energy emission from the radiator to achieve an energy density sufficient to cause the death or debilitation of the vegetation without raising the temperature of the area sufficiently to cause death or debilitation solely by thermal effects.

4. A method of vegetation control, comprising the steps of:
    generating an electromagnetic wave having a frequency in the range of from 300 MHz to 300 GHz for emission from an energy radiator; and
    subjecting an area within which vegetation is to be controlled to the electromagnetic wave emission from the energy radiator to achieve an energy density from approximately 150 Joules/cm$^2$ to approximately 300 Joules/cm$^2$ sufficient to cause the death or debilitation of the vegetation without raising the temperature of the area sufficiently to cause death or debilitation solely by thermal effects.

5. A method of vegetation control as set forth in claim 4 wherein said generated electromagnetic wave is a continuous wave.

6. A method of vegetation control as set forth in claim 4 wherein said generated electromagnetic wave is a pulsed wave.

7. A method of vegetation control as set forth in claim 4 wherein said generated electromagnetic wave is a modulated wave.

* * * * *